No. 741,407.   PATENTED OCT. 13, 1903.
W. C. McCARTER.
CHECK BOOK STUB.
APPLICATION FILED JUNE 12, 1903.
NO MODEL.

Fig. 1.

Fig. 2.

Witnesses:
Wellington W. Blewitt
Laura O. Baxter

Inventor
William C. McCarter
By James T. Watson
his Attorney.

No. 741,407.

Patented October 13, 1903.

UNITED STATES PATENT OFFICE.

WILLIAM C. McCARTER, OF DULUTH, MINNESOTA.

CHECK-BOOK STUB.

SPECIFICATION forming part of Letters Patent No. 741,407, dated October 13, 1903.

Application filed June 12, 1903. Serial No. 161,151. (No model.)

*To all whom it may concern:*

Be it known that I, WILLIAM C. MCCARTER, a citizen of the United States, residing at Duluth, in the county of St. Louis and State of Minnesota, have invented certain new and useful Improvements in Check-Book Stubs; and I do hereby declare the following to be a full, clear, and exact description of the invention, such as will enable others skilled in the art to which it appertains to make and use the same.

My invention relates to check-book stubs, and has for its object the provision of a form of stub upon which a convenient record may be kept of the dates and amounts of deposits, the numbers, dates, amounts, and character of checks drawn, and the balances remaining after deducting the amounts of checks from time to time drawn from previous amounts from time to time on deposit or after adding new deposits to previous balances.

With these objects in view it consists of the stub hereinafter described and claimed.

In the drawings, Figure 1 is a plan view of one of said stubs embodying my said invention. Fig. 2 is a plan view of my said invention, showing the same as used.

In the drawings, 1 is a stub preferably adapted at one edge to be bound into a check-book and integral at the opposite edge with checks (not shown) adapted to be torn from said stub, said arrangement being well known to the art and not deemed necessary to be herein particularly described or illustrated, or, if desired, said stub may be bound as a separate leaf facing a page of checks in a check-book. Upon said stub are printed vertically-arranged guide-lines demarking column-spaces, which, respectively, from left to right, are adapted to receive, first, as at $a$, the name or the abbreviation of the name of the month of deposit; second, as at $b$, the number of the day of the month of deposit; third, as at $c$ and $d$, respectively, the integers and decimals indicating the amount of deposit; fourth, as at $e$ and $f$, respectively, the integers and decimals indicating the amount of the check drawn; fifth, as at $g$ and $h$, respectively, the integers and decimals indicating the balance remaining after deducting the amount of the check from the amount of the previous deposit or balance. The form further consists of a series of horizontal lines arranged in groups of four at intervals, the first line, as at $i$, of each of which groups is adapted to support a check-number; the second line, as at $k$, of each of which groups is adapted to support a check-date; the third line, as at $l$, of each of which groups is adapted to support the name of the payee of said check, and the fourth line, as at $m$, of each of which groups is adapted to support a statement of the purpose for which such check is drawn. The space, as at $n$, between the groups of horizontal lines may be utilized for a continuation of such statement or for other memoranda, as desired. Said horizontal lines extend from any convenient point or points—as, for example, from a marginal line $x$ at the left—to the divisional line at the right between the deposit-date column and the deposit-amount column. At the beginning of each of said lines $i$, $k$, $l$, and $m$ is preferably printed memoranda indicating the nature of the record to be written thereon. At the head of said stub are arranged spaces in which are printed memoranda to indicate the nature of the matter to be inserted in the columns below said spaces, respectively. At the foot of said stub are arranged spaces marked by vertical and horizontal divisional lines in which is printed, first, as at $o$, memoranda to indicate the nature of the matter to be inserted in the next two spaces to the right thereof; second, as at $p$ and $q$, respectively, for the insertion of the integers and decimals of any balance brought forward from the previous stub-page and inserted at the head of the column of balances; third, as at $r$, in which is printed memoranda indicating the nature of the matter to be inserted in the spaces to the right thereof; fourth, as at $s$ and $t$, for the insertion of the integers and decimals denoting the total amount of deposits, including the balance brought from the previous page; fifth, as at $v$ and $w$, for the insertion of the integers and decimals denoting the total amount drawn by checks; sixth, as at $y$ and $z$, for the insertion of the integers and decimals of the cross-balance remaining after deducting the total amount drawn by checks from the total amount of deposits, which balance should agree with the last previous cross-balance in the same column. Marginal lines 1, 2, and 3 are also shown, which, with the marginal line $x$, are preferred, but not regarded as essential to said stub.

It will be obvious that my said invention operates to secure an arrangement of the various items which enables cross-balances to be conveniently struck after each entry and a final cross-balance to be conveniently struck from the totals. The agreement between the last balance struck from individual entries and the balance struck from the totals will prove the correctness of the balances.

Having now described my invention, what I claim, and desire to secure by Letters Patent, is—

A check-book stub embodying a form adapted to receive a record of the dates and amounts of individual deposits, the numbers, dates, names of payees, purposes of payments and amounts of checks drawn, the balances remaining after deducting the amount drawn by each check from the respectively previous balance on deposit, or after adding a new deposit to the previous balance on deposit, the total amount of individual deposits, the total amount drawn by checks and the final balance from said totals, said stub having column-spaces demarked and appropriately designated thereon respectively for the insertion of the dates of deposits, the amounts of deposits, the amounts of checks and the balances, and having a column of groups at vertical intervals of parallel horizontal lines ruled thereon, which lines in each group are respectively designated and adapted to support the record of the number of a corresponding check, the date when said check is drawn, the name of the payee of said check, and the purpose of payment, substantially as described.

In testimony whereof I hereunto affix my signature in presence of two witnesses.

WILLIAM C. McCARTER.

Witnesses:
FRED A. LEWIS,
JAMES T. WATSON.